Figure 4:
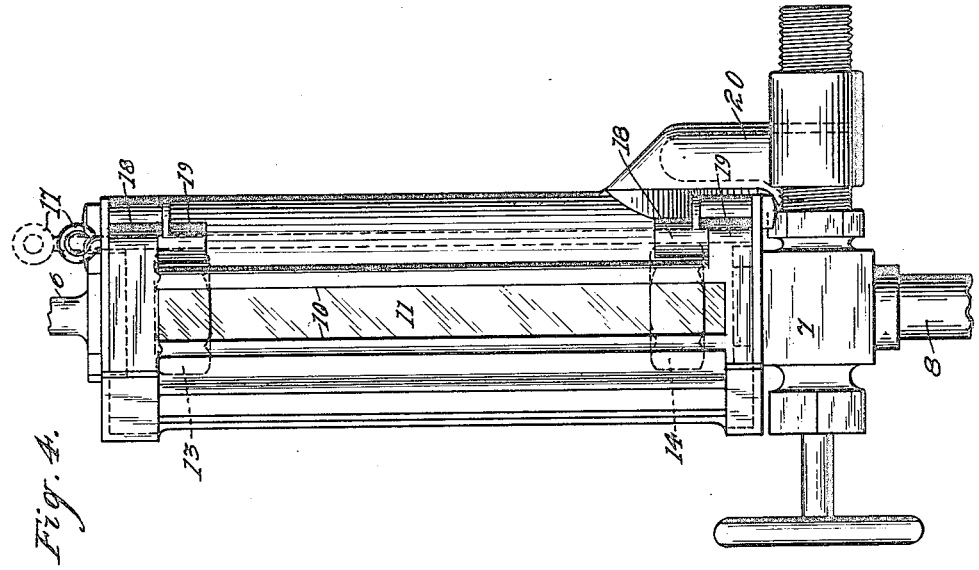

W. G. WERBECK.
MEANS FOR PROTECTING WATER GAGE TUBES OF STEAM BOILERS.
APPLICATION FILED DEC. 8, 1915.
1,213,986.
Patented Jan. 30, 1917.
3 SHEETS—SHEET 1.
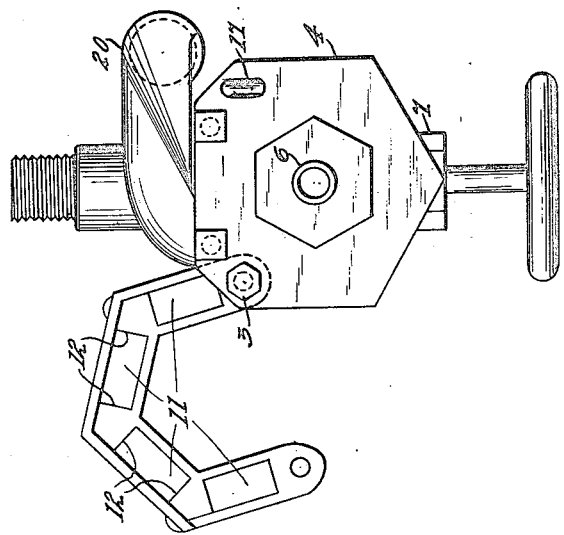
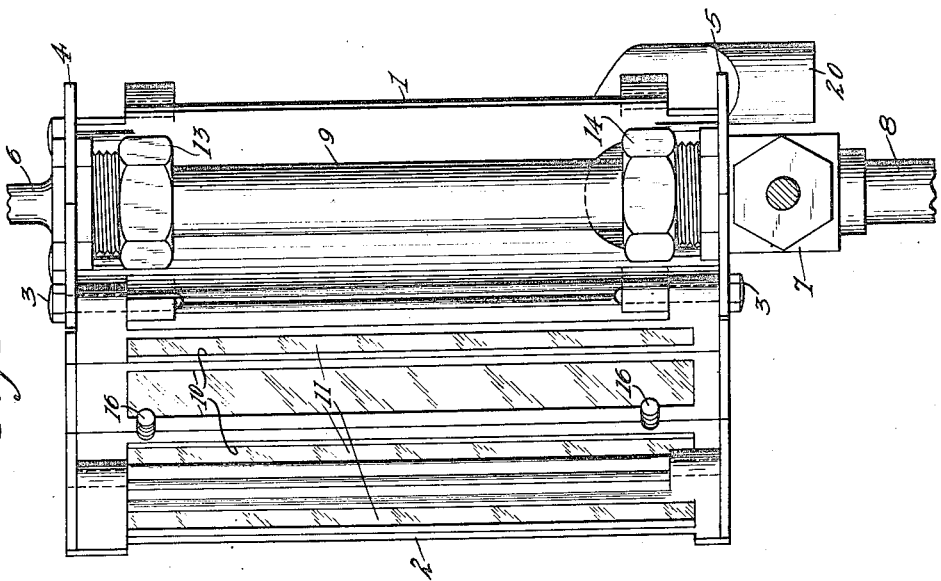
Witnesses
Paul A. Viesen
Grace Thompson
Inventor
W. G. Werbeck
H. J. Sanders
By Atty.

W. G. WERBECK.
MEANS FOR PROTECTING WATER GAGE TUBES OF STEAM BOILERS.
APPLICATION FILED DEC. 8, 1915.

1,213,986.

Patented Jan. 30, 1917.
3 SHEETS—SHEET 2.

Witnesses
Paul A. Viereu
Grace Thompson

Inventor
W. G. Werbeck
H. J. Sanders
By Atty.

W. G. WERBECK.
MEANS FOR PROTECTING WATER GAGE TUBES OF STEAM BOILERS.
APPLICATION FILED DEC. 8, 1915.
1,213,986.
Patented Jan. 30, 1917.
3 SHEETS—SHEET 3.
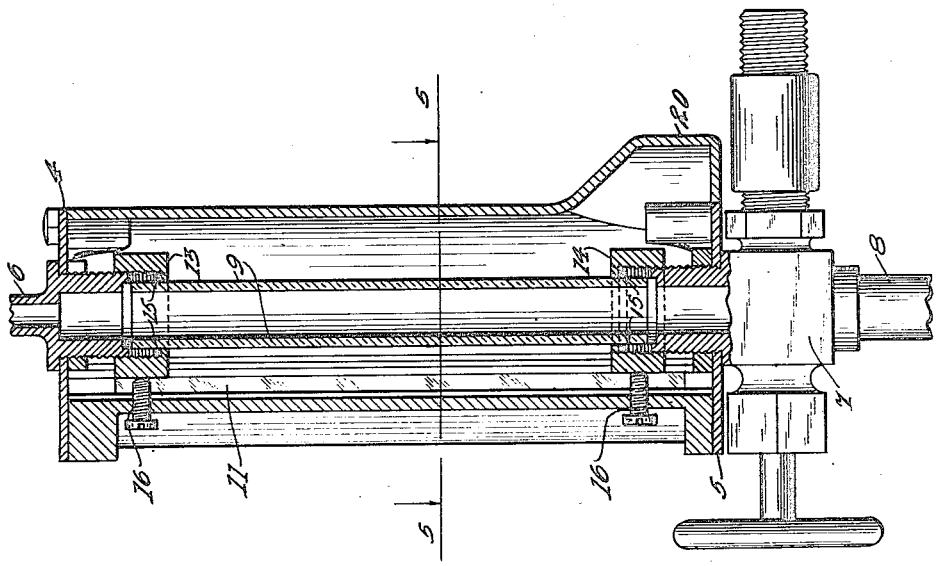
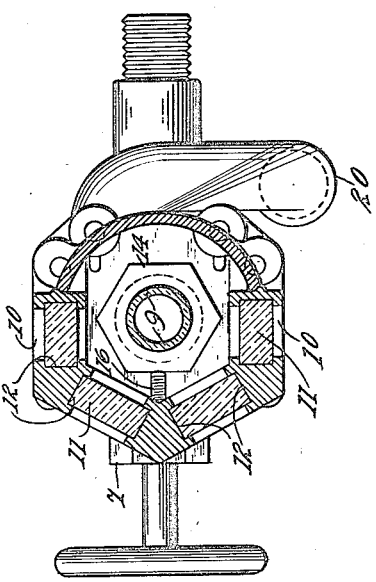
Witnesses
Paul A. Viersen
Grace Thompson
Inventor
W. G. Werbeck
H. J. Sanders
By Atty.

UNITED STATES PATENT OFFICE.

WALTER GUSTAV WERBECK, OF CHICAGO, ILLINOIS.

MEANS FOR PROTECTING WATER-GAGE TUBES OF STEAM-BOILERS.

1,213,986.
Specification of Letters Patent.
Patented Jan. 30, 1917.

Application filed December 8, 1915. Serial No. 65,719.

*To all whom it may concern:*

Be it known that I, WALTER G. WERBECK, a citizen of the United States, residing at Chicago, in the county of Cook and State of Illinois, have invented certain new and useful Improvements in Means for Protecting Water-Gage Tubes of Steam-Boilers, of which the following is a specification.

This invention relates to improved means for protecting water gage tubes of steam boilers. The fact that the water gages of steam boilers comprise a glass tube in communication with the boiler, makes serious accidents often occur due to the bursting of the tube from internal pressure and the projecting of fragments of glass along with the steam and boiling water through the atmosphere. This invention serves to prevent such accidents, and it consists of a sectional hinged glass protector which encompasses the water tube and which is provided in its swinging section with removable strips of a very hard glass through which the water in the gage tube may be easily read; the relatively stationary section of the protector being provided with an exhaust through which the steam and water may escape in the event of an accident thus reducing the pressure upon the protector and effectually preventing the breakage thereof.

Another object of the invention is to provide novel means whereby play of or accidental displacement of the gage nuts is obviated.

A further object is to provide a protector wherein the transparent glass strips can be readily cleaned and instantly removed when desired or necessary.

A further object is to provide a protector wherein the upper and lower gage glass connections are in alinement thus avoiding "twisting" or binding of the gage glass when the protector is finely adjusted.

A further object is to provide a protector so constructed as to permit almost instantaneous insertion or removal of the gage glass, the only tool needed for this operation being an ordinary monkey wrench.

A further object is to provide a device wherein the gage glass and the protector may be made a standard length to suit water columns of different heights.

A further object is to provide a device of this class that is applicable to locomotive boilers, stationary boilers and marine boilers.

A further object is to provide a protector of such simple and compact construction as to render accidental displacement of any of its parts almost an impossibility; and one in which the steam and water connections are straight and large so that scale or sediment cannot collect and obstruct a free passage of the water.

With the foregoing and other objects in view the invention consists in the combination and arrangement of parts to be hereinafter fully described in the following specification, pointed out in the appended claims and illustrated in the accompanying drawings which form a part of said specification and in which—

Figure 3:
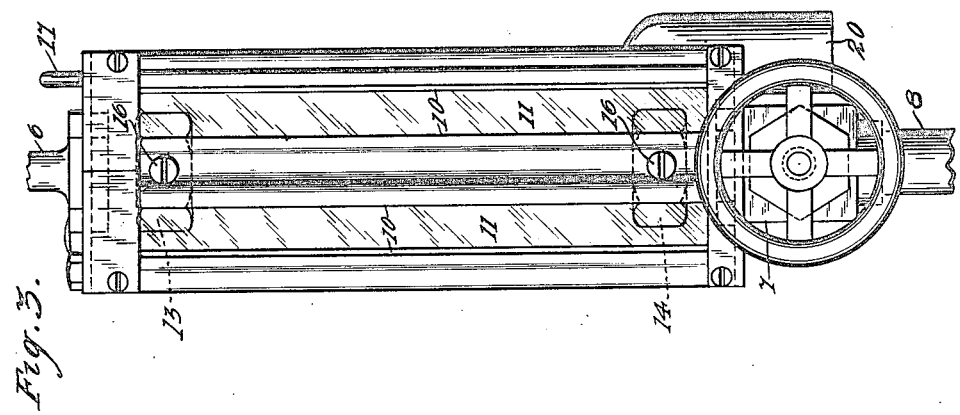

Figure 1 is a view in elevation of my invention in open position. Fig. 2 is a top plan view of Fig. 1. Fig. 3 is a view similar to Fig. 1 but in closed position. Fig. 4 is a side view of Fig. 3. Fig. 5 is a cross section taken on line 5—5 of Fig. 6. Fig. 6 is a vertical sectional view through the device.

Like reference characters denote corresponding parts throughout the several views.

My improved gage protector comprises the sections 1 and 2 the former of which is stationary and the latter a movable door-like section which is hinged to the section 1 upon the hinge pins 3. The said hinge pins also pass through the end plates 4, 5 which support the protector proper and are carried, respectively, by the nipple 6 which leads to the steam space of the boiler (not shown); and by the stem of valve 7 which is connected by lead 8 to the water space of the boiler.

The protector sections 1, 2 when in closed relation form an envelop about the gage glass 9 which, however, is visible and readable through the door-like section 2 which is formed with a plurality of apertures 10 each of which is closed by a removable strip of hard glass 11 which normally is disposed in the recessed portions 12 of the said section 2. The said gage glass is removably retained in operative relation by the gage nuts 13, 14 carried, respectively, by the threaded terminations of the nipple 6 and valve stem 7 which latter members are disposed in exact alinement with each other whereby twisting or binding stress is obviated as the said gage nuts are adjusted which nuts when in position, press the elastic washers 15 tightly against the gage glass.

The said gage glass is spaced away, at each end, from the nipple and valve stem aforesaid thus affording limited longitudinal movement or play of said glass and permitting ready removal or insertion of a glass after the gage nuts have been removed by an ordinary monkey wrench.

The door-like section 2 is provided with stop bolts 16 which when the said section is closed abut the gage nuts and prevent accidental displacement of the same. The sections 1, 2 are releasably retained in closed relation by means of a removable pintle 17 which is adapted for passage through hinge eyes 18, 19 of said sections. In the event of breakage of the gage glass pressure upon the glass strips 11 is reduced through provision of the exhaust port 20 formed in the protector section 1 through which the boiling water and steam may escape in a predetermined direction. The protector is designed to be made in a standard size and applied to water columns of various sizes since a nipple 6 can be substituted for valve 7 on water columns of more than ordinary length or valves used entirely instead of nipples upon water columns of less than ordinary length.

What is claimed is:—

1. The combination with oppositely disposed and interchangeable nipples or valves, of end plates, gage nuts adjustably carried by said nipples or valves, a gage glass connecting said gage nuts and movable with relation thereto, the movement of said gage glass being limited by contact with one or the other of said nipples or valves, an elastic packing encircling said gage glass within said gage nuts and having a positive bearing upon said gage glass as said gage nuts are adjusted, a sectional member comprising stationary and movable elements connecting said end plates, means connecting the sections of said sectional member for releasably retaining them in closed relation, an exhaust port for one of said sections and stop bolts carried by the other section for engagement with said gage nuts whereby displacement of the same is prevented.

2. The combination with oppositely disposed nipples, of end plates, gage nuts adjustably carried by said nipples, a gage glass connecting said gage nuts, a sectional member comprising stationary and movable elements connecting said end plates, means connecting the sections of said sectional member for releasably retaining them in closed relation, an exhaust port for one of said sections and stop bolts carried by the other section for engagement with the said gage nuts whereby displacement of the same is obviated.

In testimony that I claim the foregoing as my own I have hereto affixed my signature in the presence of two subscribing witnesses.

WALTER GUSTAV WERBECK.

Witnesses:
GEORGE C. KEECH,
EDW. A. ENGELBERT.